(12) United States Patent
Kulinsky et al.

(10) Patent No.: US 11,912,900 B2
(45) Date of Patent: Feb. 27, 2024

(54) STEP-WISE FABRICATION OF CONDUCTIVE CARBON NANOTUBE BRIDGES VIA DIELECTROPHORESIS

(71) Applicant: THE REGENTS OF THE UNIVERSITY OF CALIFORNIA, Oakland, CA (US)

(72) Inventors: Lawrence Kulinsky, Irvine, CA (US); Tuo Zhou, Irvine, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 0 days.

(21) Appl. No.: 17/223,459

(22) Filed: Apr. 6, 2021

(65) Prior Publication Data

US 2021/0309869 A1    Oct. 7, 2021

Related U.S. Application Data

(60) Provisional application No. 63/005,860, filed on Apr. 6, 2020.

(51) Int. Cl.
| | |
|---|---|
| C09D 5/44 | (2006.01) |
| C25D 13/12 | (2006.01) |
| C25D 13/22 | (2006.01) |
| C25D 17/10 | (2006.01) |

(52) U.S. Cl.
CPC .......... C09D 5/4476 (2013.01); C25D 13/12 (2013.01); C25D 13/22 (2013.01); C25D 17/10 (2013.01)

(58) Field of Classification Search
None
See application file for complete search history.

(56) References Cited

U.S. PATENT DOCUMENTS

| | | | | |
|---|---|---|---|---|
| 2003/0190278 A1* | 10/2003 | Wang | ........... | D01F 9/127 423/447.3 |
| 2004/0228961 A1* | 11/2004 | Smits | ........... | B82Y 30/00 427/2.13 |
| 2018/0111829 A1* | 4/2018 | Sam | ........... | B82Y 10/00 |

FOREIGN PATENT DOCUMENTS

| | | | | |
|---|---|---|---|---|
| JP | 2006228818 A | * | 8/2006 | |
| JP | 2006329802 A | * | 12/2006 | |
| KR | 20110001713 A | * | 1/2011 | .......... H01L 51/0048 |
| KR | 101128015 B1 | * | 3/2012 | ....... H01L 21/82341 |
| WO | WO-2011163556 A2 | * | 12/2011 | ............. B82Y 10/00 |

* cited by examiner

*Primary Examiner* — Louis J Rufo
(74) *Attorney, Agent, or Firm* — NGUYEN TARBET LLC

(57) ABSTRACT

Carbon nanotube (CNT) agglomerates can be aligned along the field lines between adjacent electrodes to form conductive bridges. The present invention is directed to a stepwise process of dielectrophoretic deposition of CNTs to form conducting bridges between adjacent electrodes spanning lengths over 50 microns. The CNT bridges are permanently secured using electrodeposition of the conducting polymer polypyrrole. Morphologies of the CNT bridges formed within a frequency range of 1 kHz and 10 MHz are employed and explained as a consequence of interplay between dielectrophoretic and electroosmotic forces. Post-deposition heat treatment increases conductivity of CNT bridges likely due to solvent evaporation and resulting surface tension inducing better contact between CNTs.

20 Claims, 14 Drawing Sheets

(11 of 14 Drawing Sheet(s) Filed in Color)

10MHz 5V peak to peak

1MHz 5V peak to peak

100kHz 5V peak to peak

10kHz 5V peak to peak

1kHz 5V peak to peak

|  | CNT (kΩ) | CNT + HT (kΩ) | CNT + HT + PPy (kΩ) | CNT + HT + PPy + HT (kΩ) |
|---|---|---|---|---|
| Sample 1 | | | | |
| 10 MHz | 5.86 ± 0.09 | 1.09 ± 0.11 | 2.82 ± 0.02 | 1.98 ± 0.01 |
| 1 MHz | 12.43 ± 0.1 | 2.04 ± 0.01 | 3.11 ± 0.04 | 2.17 ± 0.10 |
| 100 kHz | 9.75 ± 0.12 | 1.05 ± 0.01 | 2.88 ± 0.04 | 2.05 ± 0.02 |
| 10 kHz | 12.83 ± 0.08 | 1.41 ± 0.02 | 7.01 ± 0.21 | 3.31 ± 0.05 |
| 1 kHz | 31.27 ± 0.15 | 3.34 ± 0.33 | 9.54 ± 0.20 | 6.74 ± 0.25 |
| Sample 2 | | | | |
| 10 MHz | 6.26 ± 0.05 | 1.08 ± 0.01 | 2.01 ± 0.17 | 1.31 ± 0.02 |
| 1 MHz | 12.04 ± 0.08 | 1.76 ± 0.02 | 4.61 ± 0.10 | 4.17 ± 0.03 |
| 100 kHz | 10.39 ± 0.18 | 1.07 ± 0.01 | 2.83 ± 0.51 | 1.76 ± 0.02 |
| 10 kHz | 10.31 ± 0.23 | 1.82 ± 0.02 | 6.65 ± 0.40 | 4.04 ± 0.06 |
| 1 kHz | 13 ± 0.07 | 1.88 ± 0.01 | 2.57 ± 0.19 | 2.13 ± 0.06 |

FIG. 7

10MHz 5V peak to peak

1MHz 5V peak to peak

100kHz 5V peak to peak

10kHz 5V peak to peak

Before Heat Treatment 2

After Heat Treatment 2

STEP-WISE FABRICATION OF CONDUCTIVE CARBON NANOTUBE BRIDGES VIA DIELECTROPHORESIS

CROSS-REFERENCES TO RELATED APPLICATIONS

This application is a non-provisional and claims benefit of U.S. Provisional Application No. 63/005,860 filed Apr. 6, 2020, the specification of which is incorporated herein in their entirety by reference.

STATEMENT REGARDING FEDERALLY SPONSORED RESEARCH OR DEVELOPMENT

This invention was made with government support under Grant No. CMMI-1661877 awarded by the National Science Foundation. The government has certain rights in the invention.

FIELD OF THE INVENTION

The present invention is directed to a method of dielectrophoretic deposition of carbon nanotubes (CNTs) or other nanostructures to form conducting bridges between adjacent electrodes spanning lengths over 50 microns.

BACKGROUND OF THE INVENTION

CNTs, along with other high aspect ratio tubular carbon structures, have drawn considerable interest due to their extraordinary physical, mechanical, and electrical properties. CNTs are often used for the enhanced performance of electronic devices such as chemical and biological sensors, field-effect transistors, energy storage systems, computing devices, and conductive interconnects. Therefore, the integration of CNTs onto predetermined positions in micro- and nano-systems is a critical technology that has been extensively studied. A variety of techniques have been developed to assemble or manipulate individual CNTs or CNT bundles onto desired electrode locations. For example, an atomic force microscope (AFM) tip was used to handle the conveyance of a single multiwalled carbon nanotube to a specific location; the capture of nanotube bundles was carried out by magnetic field, a combination of conventional and optically induced dielectrophoresis was used to create a line of CNTs between two electrodes, CNT transfer technology has been developed to transfer CNT bundles, CNTs were collected in microgrooves via fluidic assembly, and photosensitive chemically binding agents were used to secure CNTs to specific sites. However, the majority of these techniques are slow, laborious, expensive, and in many cases the aligned CNTs do not produce conductive bridges. In the present work a stepwise process that can produce conductive bridges, self-assembled out of a CNT suspension and constructed within the high field areas between adjacent electrodes under the influence of dielectrophoresis (DEP) is described.

Dielectrophoresis refers to the force exerted by an external electric field on the induced dipole moment of a particle (i.e. a nanotube) suspended in a dielectric medium. The polarizability of the particle depends on its geometry and on the difference in the complex permittivities between itself and the surrounding medium. Under an applied AC field, these complex permittivities vary throughout a range of frequencies, and determine the direction and magnitude of the DEP force. The magnitude of the induced dipole moment of the CNT is larger along the tube's axis than in the perpendicular direction and consequently, a rotating moment is created to align the CNT along the electrical field lines. The following equation can be used to calculate the DEP force exerted on the polarized nanotube suspended in a medium:

$$F_{DEP} = \frac{\pi r^2 l}{6} \varepsilon_m Re[f_m] \nabla E_{rms}^2$$

Where l and r are the length and the molecular radius of the single CNT, respectively, $\varepsilon_m$ is the permittivity of the medium, $E_{rms}$ represents the root mean square of the applied electric field, and $Re[f_m]$ is the real part of the Clausius-Mossotti factor, $f_m$, given by the following equation:

$$f_m = \frac{\varepsilon_n^* - \varepsilon_m^*}{(\varepsilon_n^* - \varepsilon_m^*)A_L + \varepsilon_m^*}$$

Where $A_L$ is the depolarization factor, $\varepsilon_n^*$ and $\varepsilon_m^*$ are the complex permittivities of nanotube and medium, respectively, as defined by the following equation:

$$\varepsilon^* = \varepsilon - j\frac{\sigma}{\omega}$$

where $\varepsilon$ and $\sigma$ are the permittivity and conductivity, respectively, and w is the frequency of the applied electric field.

In general, if the real part of the complex permittivity of the particle is greater than that of the fluid medium, the DEP force will be "positive," or directed towards the point of the highest field's intensity. If the real part of the complex permittivity of the particle is smaller than the fluid medium, the particle will feel a "negative" DEP force (nDEP) and be forced away from the regions of high field intensity. The sign of the real part of the Clausius-Mossotti factor determines if the particle will experience a positive or negative DEP force.

As the distance between adjacent electrodes increases, so does the difficulty in creating conductive bridges made of nanoparticulates, as the bridges tend to branch into dendritic structures away from the electrodes, as observed previously. Many researchers have bridged gaps reaching sub-micron to several micron meter distances, sizes comparable to the lengths of the CNTs. Researchers have also created dense forests of nanotube bridges between electrodes that were 25 microns apart. The present invention features a process of creating conductive CNT bridges spanning over 50 microns. In order to achieve this result, the present invention employs the technique of stepwise DEP deposition described below.

BRIEF SUMMARY OF THE INVENTION

It is an objective of the present invention to provide methods that allow for dielectrophoretic deposition of CNTs and other nanostructures to form conducting bridges between adjacent electrodes spanning lengths over 50 microns, as specified in the independent claims. Embodiments of the invention are given in the dependent claims. Embodiments of the present invention can be freely combined with each other if they are not mutually exclusive.

The present invention features a method that allows long conductive bridges fabricated out of CNTs and other nanostructures connecting electrodes separated by distances larger than 50 microns to be made via non-contact electrokinetic forces, avoiding prior pick-and-place slow and expensive assembly operations. The method of the present invention may comprise providing a first and second electrode and depositing a droplet containing a suspension of CNTs within it. The method may further comprise applying a constant AC bias to the first electrode to allow the CNT bridge to form from the suspension of CNTs. The method may further comprise drying the droplet and causing it to evaporate and pull the CNTs closer together. Heat may optionally then be applied to the CNTs. The method may optionally further comprise depositing and electropolymerizing a solution over the CNTs, followed by an additional drying procedure and application of heat. The prior steps may be repeated until a distance between the first and second electrode is spanned by a CNT conductive bridge.

One of the unique and inventive technical features of the present invention is the use of a deposition-drying-deposition sequence of steps for the creation of conductive CNT bridges between adjacent electrodes. Without wishing to limit the invention to any theory or mechanism, it is believed that the technical feature of the present invention advantageously provides for time and resource efficient production of conductive CNT bridges spanning a distance greater than or equal to 50 microns. None of the presently known prior references or work has the unique inventive technical feature of the present invention. Furthermore, the prior references teach away from the present invention. For example, the prior art teaches that dielectrophoresis can be used with a continuous deposition and the current invention counters the strategy of the prior art by offering step-wise deposition+drying+deposition+drying strategy. The methods described herein are also scalable and may be used to prepare CNT bridges of any length.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE SEVERAL VIEWS OF THE DRAWINGS

The patent application or application file contains at least one drawing executed in color. Copies of this patent or patent application publication with color drawings will be provided by the Office upon request and payment of the necessary fee.

The features and advantages of the present invention will become apparent from a consideration of the following detailed description presented in connection with the accompanying drawings in which:

FIG. 2A shows a side view of an embodiment of the electrode array. FIG. 2B shows a top view of an embodiment of the electrode array.

FIG. 3A shows a progression of CNT bridges formed by the method of the present invention. FIG. 3B shows CNT bundles attracted by a one-step procedure.

FIG. 4A shows the field distribution near an individual CNT bundle. FIG. 4B shows results of the simulation indicate that during bridge formation, regions of highest field intensity shift from the edges of the electrodes to the ends of the CNT bridges.

FIG. 6A shows an SEM image of the CNT bridges at 1530 magnification.

FIG. 6B shows an SEM image of the CNT bridges at 1525 magnification.

FIG. 7 shows a table of resistivities of CNT bridges throughout the various steps of the method of the present invention.

FIG. 8A shows graphs of CNT resistance of a first sample at various 5 Vpp AC bias frequencies. FIG. 8B shows graphs of CNT resistance of a second sample at various 5 Vpp AC bias frequencies.

FIG. 9A shows that remaining droplets present after blow drying keeps CNTs separated. FIG. 9B shows that evaporation of the remaining solvent after heat treatment and the resulting changes in surface tension act to pull CNTs together, improving CNT-CNT contact.

FIG. 11A shows that polypyrrole deposition envelops CNT bridges with remaining solvent after the final heat treatment. FIG. 11B shows that less dramatic changes in resistance were observed before and after the final heat treatment due to the polypyrrole later preventing complete evaporation of the solvent.

DETAILED DESCRIPTION OF THE INVENTION

Figure 1:
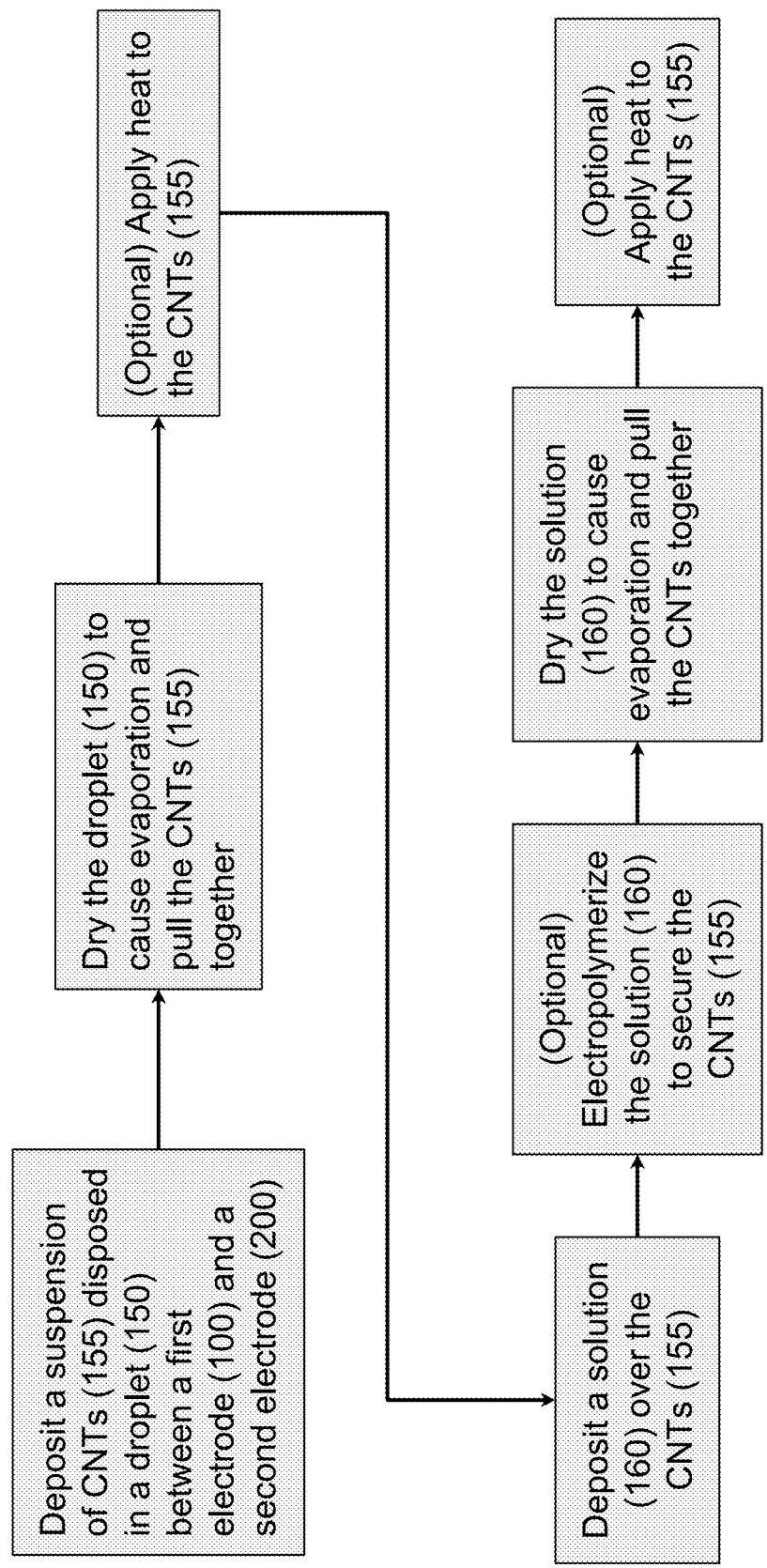
FIG. 1 shows a flow chart of the method of the present invention for producing CNT conducting bridges.

Following is a list of elements corresponding to a particular element referred to herein:
100 first electrode
150 droplet
155 CNTs
156 fixed CNTs
160 solution
200 second electrode As used herein, the term "minimal branching" refers to the structure of the CNT conductive bridges. As the distance between adjacent electrodes increases, so does the difficulty in creating conductive bridges made of nanoparticulates, as the bridges tend to branch into dendritic structures away from the electrodes. CNT conductive bridges with minimal branching have an orderly structure that is not dendritic. Additionally, as bridges start to span the wider gaps between the electrodes, CNT-to-CNT contact resistance starts to increase as adjacent CNTs no longer come into direct contact and eventually for larger gaps the resistance between the adjacent CNTs becomes very high and thus the dielectrophoretic force falls dramatically and is not sufficient anymore for attracting additional CNTs from the solution and the bridge formation stops. The present invention delineates the method of overcoming increase in CNT-to-CNT contact resistance as the conductive bridge grows. These methods include interspersing the drying steps (pulling CNTs together and decreasing their contact CNT-to-CNT resistance) with dielectrophoretic attraction of additional CNTs to the growing conductive CNT bridge.

The present invention features a method for fabricating conducting bridges between adjacent electrodes. The method may comprise depositing a droplet (150) containing a suspension of conductive or dielectric nanostructures between a first electrode (100) and second electrode, applying voltage to the suspension of conductive or dielectric nanostructures using the first electrode (100), drying the droplet (150) containing the suspension of conductive nanostructures such that the droplet (150) evaporates leaving the conductive or dielectric nanostructures behind, depositing a solution (160) over the conductive nanostructures, and repeating these steps until a distance between the first electrode (100) and a second electrode (200) is spanned by the conducting bridges.

In some embodiments, the method may additionally comprise heating the conductive or dielectric nanostructures. As non-limiting examples, the method may include heating the conductive or dielectric nanostructures once per deposition of the conductive or dielectric nanostructures or once after multiple depositions of the conductive or dielectric nanostructures. In some embodiments, the method may additionally comprise depositing a solution (160) over the conductive or dielectric nanostructures and electropolymerizing the solution (160). As non-limiting examples, the method may include depositing and electropolymerizing the solution (160) once per deposition of the conductive or dielectric nanostructures or once after multiple depositions of the conductive or dielectric nanostructures.

In other embodiments, the method may comprise applying heat to the conductive or dielectric nanostructures after the conducting bridges span the distance between the first electrode (100) and a second electrode (200). In some embodiments, the method may comprise electropolymerizing the solution (160) after applying heat to the conductive or dielectric nanostructures. In other embodiments, the method may comprise electropolymerizing the solution (160) after the conducting bridges span the distance between the first electrode (100) and a second electrode (200).

In yet another embodiment, the method may comprise applying heat to the conductive or dielectric nanostructures before depositing the solution (160) over the conductive or dielectric nanostructures. In further embodiments, the method may comprise electropolymerizing the solution (160) after applying heat to the conductive or dielectric nanostructures. In other embodiments, the method may comprise electropolymerizing the solution (160) after depositing the solution over the conductive or dielectric nanostructures.

In some embodiments, the conductive or dielectric nanostructures are formed from conductive or dielectric materials. Non-limiting examples of the conductive or dielectric nanostructures include gold nanoparticles, gold nanofilaments, silver nanoparticles, silver nanofilaments, or carbon nanotubes (CNTs). In preferred embodiments, the conductive or dielectric nanostructures are CNTs (155). In further embodiments, the CNTs are single-wall CNTs, multi-wall CNTs, allotropic CNTs, or a combination thereof. In other embodiments, the droplet (150) containing the suspension of conductive nanostructures is dried after electropolymerizing the solution (160) such that the droplet (150) further evaporates. In further embodiments, the droplet (150) may be dried using a nitrogen gun.

Referring now to FIG. 1, the present invention features a method for fabricating carbon nanotube (CNT) conducting bridges between adjacent electrodes. The method may comprise depositing a droplet (150) containing a suspension of CNTs (155) between a first electrode (100) and a second electrode (200), applying voltage to the suspension of CNTs (155) using the first electrode (100), drying the droplet (150) containing the suspension of CNTs (155) such that the droplet (150) evaporates leaving the CNTs (155) behind, depositing a solution (160) over the CNTs (155), and repeating these steps until a distance between the first electrode (100) and a second electrode (200) is spanned by the CNT conducting bridge. The method may optionally comprise heating the CNTs once per deposition of the CNTs or once after multiple depositions of the CNTs. The method may optionally comprise electropolymerizing the solution (160) once per deposition of the CNTs or once after multiple depositions of the CNTs.

In other embodiments, the method further comprises applying heat to the CNTs after the CNT conducting bridges span the distance between the first electrode (100) and a second electrode (200). In some embodiments, the method further comprises electropolymerizing the solution (160) after applying heat to the CNTs. In other embodiments, the method comprises electropolymerizing the solution (160) after the CNT conducting bridges span the distance between the first electrode (100) and a second electrode (200).

In yet another embodiment, the method comprises applying heat to the CNTs before depositing the solution (160) over the conductive or dielectric nanostructures. In further embodiments, the method comprises electropolymerizing the solution (160) after applying heat to the CNTs. In other embodiments, the method comprises electropolymerizing the solution (160) after depositing the solution over the CNTs.

In some embodiments, the droplet (150) may comprise isopropyl alcohol or other aqueous systems that impede clumping of the conductive nanostructures. In other embodiments, the CNTs (155) may comprise single-wall CNTs, multi-wall CNTs, allotropic CNTs, or a combination thereof. In other embodiments, the voltage applied to the CNTs (155) may be between about 1V to 10V. In preferred embodiments, the voltage applied to the CNTs is a constant 5V peak-to-peak voltage. In further embodiments, the voltage applied to the CNTs (155) is applied at a frequency within a range of 100 kHz to 10 MHz. In preferred embodiments, the voltage applied to the CNTs (155) is a constant 5V peak-to-peak voltage applied at a frequency of at least 100 kHz.

In other embodiments, the droplet (150) may be dried using a nitrogen gun. In further embodiments, the method may further comprise applying heat to the CNTs (155). Temperatures up to about 200° C. of heat may be applied to the CNTs (155). In some embodiments, the solution (160) may comprise an electropolymerization monomer, NaDBS (sodium dodecyl-benzene-sulfonate), and deionized water. Non-limiting examples of electropolymerization monomers that may be used include pyrrole, aniline, or acetylene.

In some embodiments, the droplet (160) containing the suspension of CNTs (155) is dried after electropolymerizing the solution (160) such that the solution (160) further evaporates. In other embodiments, the distance between the first electrode (100) and the second electrode (200) is about 50 microns.

In some embodiments, the present invention features a CNT conducting bridge, having a length greater than 30 microns. In other embodiments, the CNT conducting bridge has a resistance of about 2 kΩ. In preferred embodiments, the CNT bridge has an orderly structure that has minimal branches. It has been observed that the morphologies of CNT bridges deposited at frequencies of 100 kHz and above are more orderly than for CNT bridges deposited at lower frequencies. At relatively low frequencies, such as 10 kHz and 1 kHz, electro-osmotic (EO) forces generate fluidic circulation near the edges of the fingers of the IDEAs where the electric field intensity is strongest. In the presence of these electro-osmotic forces, the alignment of the CNTs is disturbed and branching occurs.

In some embodiments, the conductive nanostructures are conductive or dielectric materials. Non-limiting examples of the conductive nanostructures include gold nanoparticles, gold nanofilaments, silver nanoparticles, silver nanofilaments, or carbon nanotubes (CNTs). In preferred embodiments, the conductive nanostructures are CNTs (155). In further embodiments, the CNTs are single-wall CNTs, multi-wall CNTs, allotropic CNTs, or a combination thereof.

In other embodiments, any of the methods described herein may further comprise thermocycling the CNT conducting bridges. In some embodiments, the CNT conducting bridges are heated and cooled repeatedly. The CNT conducting bridges may be heated up to about 1000° C. and cooled to about 4° C. In preferred embodiments, the CNT conducting bridges are heated up to about 200° C. and cooled to about 4° C. Without wishing to limit the present invention to any theory or mechanism, thermocycling the CNT conductive bridges increases the conductivity of the CNT conductive bridges by decreasing the CNT-to-CNT contact resistance.

In some embodiments, any of the methods described herein may be scaled to prepare CNT conductive bridges of any length. The CNT conductive bridges may be about 30 microns, 50 microns, 75 microns, 100 microns, 175 microns, or greater in length. In some embodiments, multiple droplets (150) containing the suspension of CNTs are deposited in a line on a substrate between a first electrode (100) and a second electrode (200). In other embodiments, a first electrode (100) and a second electrode (200) are iteratively moved apart as the suspension of CNTs are deposited.

Figure 4A:
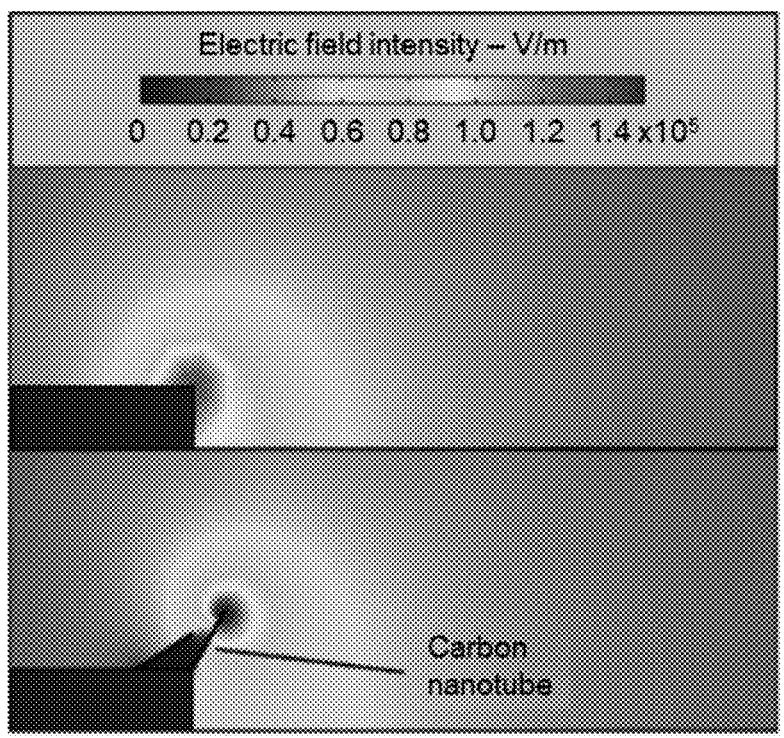
FIGS. 4A-4B show a Comsol simulation of electric field intensity around an end of CNTs in a method of the present invention.
Figure 4B:
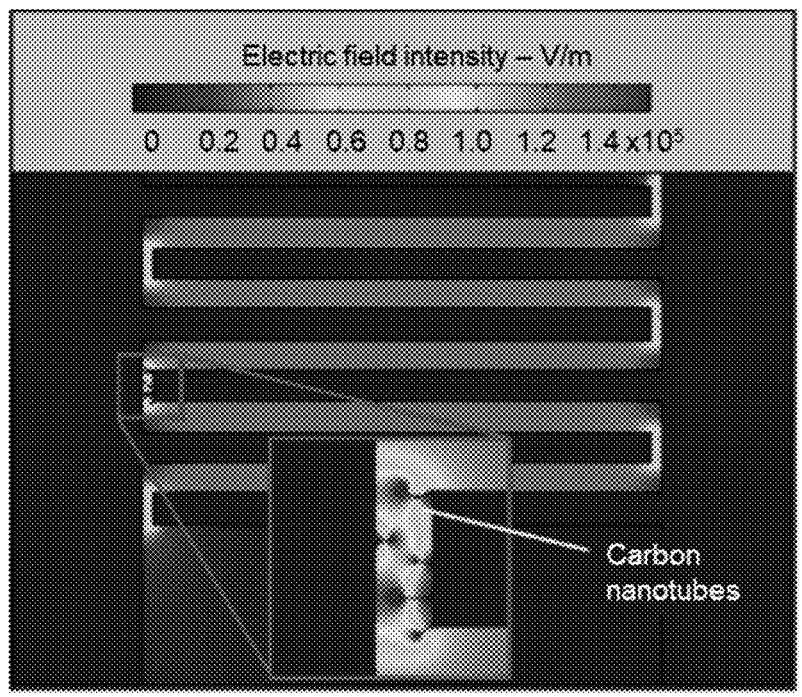
Figure 5A:
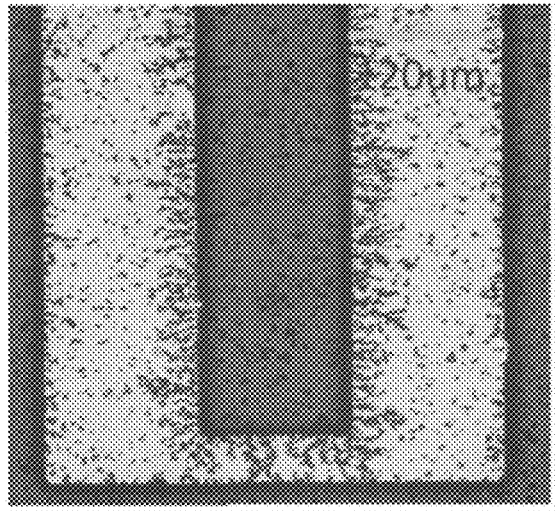
FIGS. 5A-5E show CNT bridges deposited under varying frequencies of 5 Vpp AC bias.
Figure 5B:
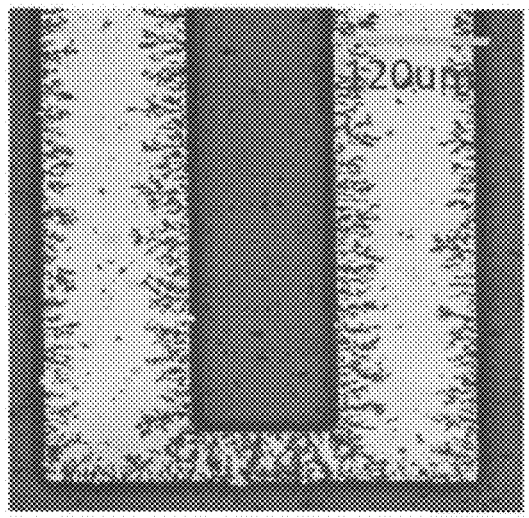
Figure 5C:
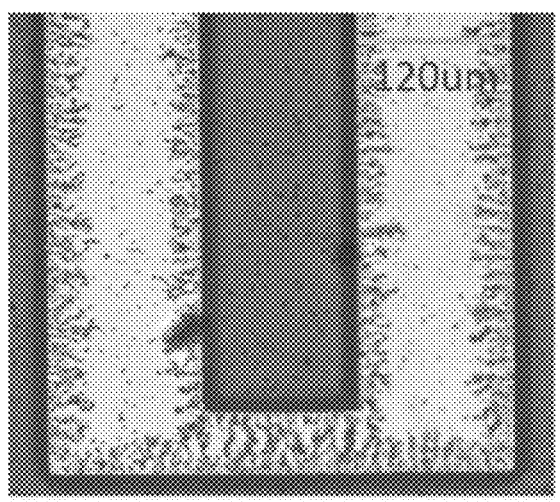
Figure 5D:
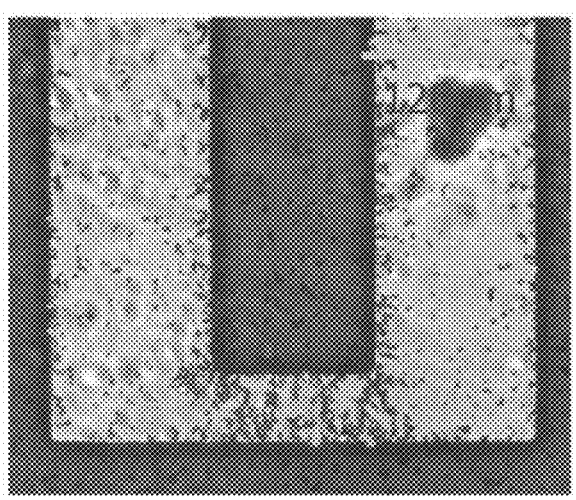
Figure 5E:
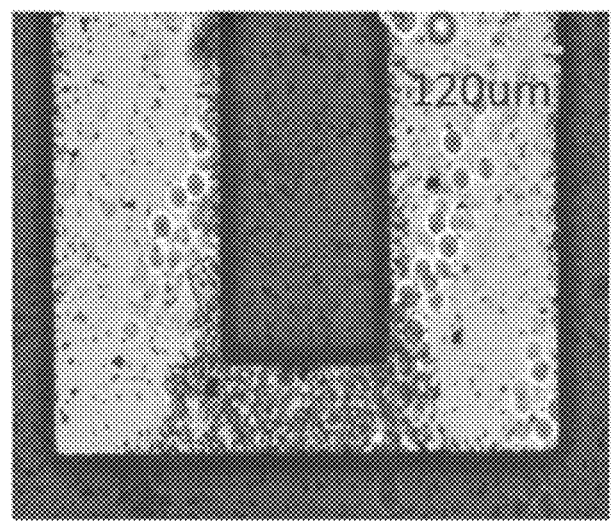

The present invention features an alternative to continuous CNT deposition—a stepwise deposition where first one droplet of CNT suspension is deposited over the electrodes to enable CNT segments to begin forming under the influence of DEP forces. The solution is then dried from CNT suspension, or the droplet of solvent is left alone to evaporate. Evaporation usually takes just a few minutes as the CNT suspension is not covered by the glass slide. Without wishing to limit the present invention to any theory or mechanism, as the solvent evaporates, surface tension of shrinking droplets surrounding the deposited CNTs pull CNTs together, enabling better contact, and consequently forming a CNT spike that results in an area of high field as demonstrated by the results of the Comsol simulation shown in FIG. 4.

EXAMPLE

The following is a non-limiting example of the present invention. It is to be understood that said example is not intended to limit the present invention in any way. Equivalents or substitutes are within the scope of the present invention.

Materials and Methods

Fabrication of IDEAs

The carbon interdigitated electrode arrays (IDEA) (utilized to generate the non-uniform electric field and form the conductive CNT bridges via DEP attraction and alignment) were fabricated with the standard lithographic process using photosensitive SU-8 resin, followed by pyrolysis in a nitrogen environment to convert the photo-patterned resist precursor into glassy carbon electrodes. Each IDEA consists of 3 electrode finger pairs. The width and length of each individual electrode finger are 120 μm and 1200 μm, respectively. The distance between the adjacent parallel electrode fingers is 120 μm and the smallest distance between the electrodes (at the tip of the electrode finger) is 50 microns.

SU-8 2025 photoresist (Microchem Corp. Ltd, MA, USA) was spin coated onto a 4" silicon wafer covered with 1 μm thick thermal oxide layer (University Wafer, MA, USA) using a Laurell photoresist spinner (Laurell Technologies, PA, USA) at an initial speed of 500 rpm for 10 seconds, followed by 4000 rpm spin for 30 seconds. The soft-baking was carried out on a programmable hot plate (Dataplate, Pmc 732 Series, IA, USA) at 95° C. for 5 minutes. The wafer was then exposed through a photomask (CadArt, OR, USA) to UV light at an energy intensity of 10 mW/cm$^2$ for 6 s using the Karl Suss MA56 Mask Aligner (Karl Suss, Germany). The subsequent post-bake procedure was performed on the same hot plate by initially heating the wafer at 65° C. for 1 minute, followed by a 95° C. step for 5 minutes. The uncrossed-linked resist was washed away in SU-8 developer (Microchem Corp. Ltd, MA, USA). The remaining cross-linked resist layer was then hot-baked at 150° C. for 20 minutes. The carbonization of the IDEAs was performed by gradually heating up the wafer containing them to 900° C. inside a pyrolysis furnace (Thermo Fisher Scientific, MA, USA), within a nitrogen environment. The pyrolysis started at 25° C. for two hours, followed by a 69 minute ramp to 300° C., where the temperature was held for one hour before a subsequent 90 minute ramp to 900° C., where the temperature was held again with a dwell time of one hour before being allowed to naturally cool to room temperature overnight. Individual IDEA chips were diced from the wafer. Indium solder was used to attach wires to the carbon IDEA chips. During the pyrolysis step, the polymer precursor shrinks laterally as the carbon electrodes are formed. Since the top of the electrode shrinks to a larger degree than its base, the sidewall of the carbon electrode becomes tapered.

Preparation of the CNT Suspension

The CNT suspension was prepared by dispersing 0.005 g of CNT powder containing a mix of single-wall and multi-wall nanotubes (Aldrich Chemistry, MO, USA) into 10-mL of isopropyl alcohol (IPA). The suspension was then centrifuged in an Eppendorf 5702 Centrifuge (Eppendorf AG, Germany) at 3000 rpm for 15 minutes. A pipette (Labnet, NJ, USA) was used to collect the supernatant with homogeneously distributed CNTs.

Preparation of the Pyrrole Solution

A mixed solution of 0.1M pyrrole monomers (Aldrich Chemistry, MO, USA) and 0.1 M NaDBS (sodium dodecyl-benzene-sulfonate) (Aldrich Chemistry, MO, USA) was prepared by dissolving 0.693 mL of pyrrole monomers and 3.48 g of NaDBS into 100 mL of deionized (DI) water. The solution was stirred at room temperature for 20 minutes using a magnetic stirrer (Fisher Scientific, NH, USA).

Deposition of CNT Bridges, Resistance Measurement, and Heat Treatment

Wires soldered to an IDEA chip were connected to the function generator (Stanford Research Systems, CA, USA) to apply a constant 5V peak-to-peak (Vpp) voltage at various frequencies. A polymer cage cut out of double-sided stick tape (3M, MN, USA) was used to contain the suspension of CNTs atop of the IDEAs. The CNT suspension was deposited in a series of 10 µL drops. A microscope glass slide (Thermo Fisher Scientific, Fisherbrand, MA, USA) was placed atop of the IDEA chip/polymer cage assembly to decrease the evaporation rate of the solution. The resistance between the fingers was measured with a 3320 Innova multimeter (Innova, CA, USA). In order to facilitate solvent evaporation after deposition, the IDEA chips were placed on a hot plate (Fisher Scientific, NH, USA) at 200° C. for 20 minutes. The resistance of the CNT bridges was measured again after the heat treatment. This was done to understand the extent to which the evaporation of the residual solution induces closer contact between the nanotubes.

Polypyrrole Deposition

The perpetual capture of CNT bridges was achieved by micro-pipetting 10 µL of pyrrole/NaDBS solution over the finger regions of the IDEAs where the CNT bridges formed, and by applying a DC voltage of 0.9 V for about 90 seconds (deposition was stopped when polypyrrole reached across the CNT bridge). After polypyrrole deposition the resistance was measured, and the IDEA chips were placed on the hot plate at 200° C. for 20 minutes followed by another resistance measurement. An optical microscope (Nikon Eclipse, Japan) and video editing program (SPOT Basic) were utilized to observe and record resulting CNT bridges on IDEA chips. Scanning Electron Microscope (SEM) images were recorded under low current setting using Magellan 400 XHR SEM (FEI, Hillsboro, Oreg., USA).

Finite Element Analysis Multiphysics Simulation

Figure 2A:
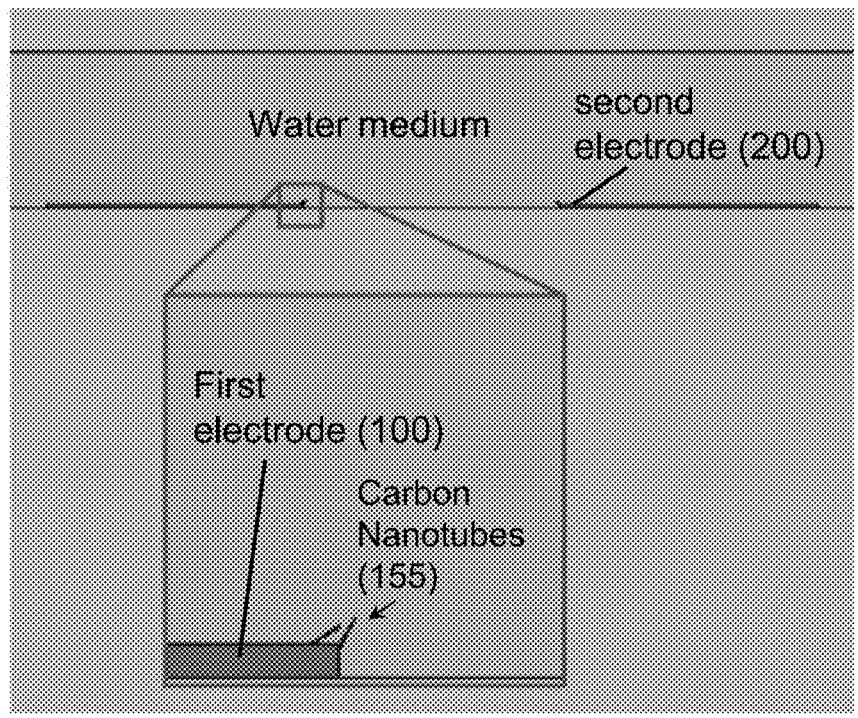
FIGS. 2A-2B show CAD drawings of the interdigitated electrode arrays (IDEA) used in the Comsol simulation.
Figure 2B:
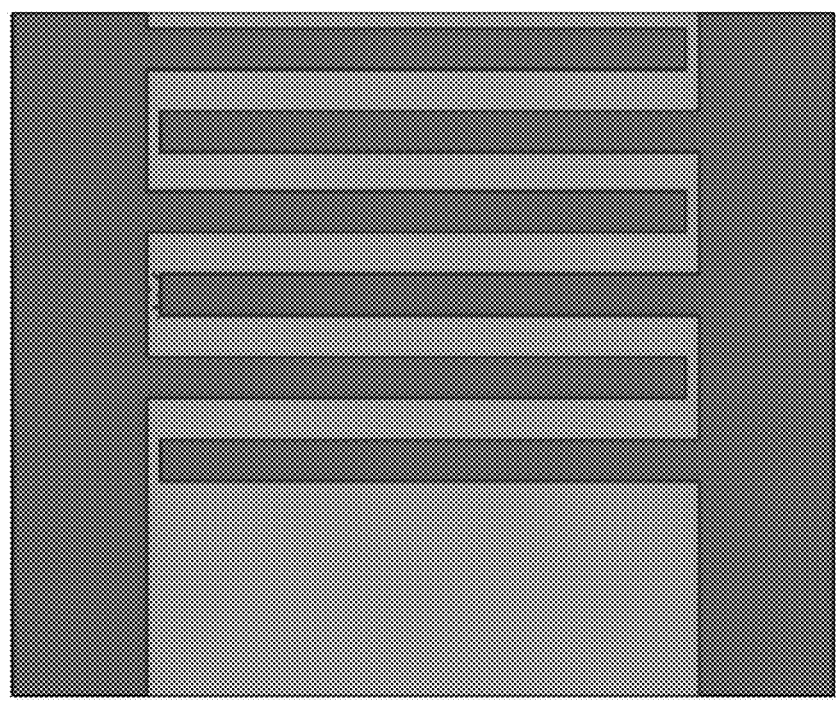

The finite element analysis simulation was carried out with Comsol Multiphysics package (version 5.2) (Comsol, MA, USA). 2-D CAD models of the electrode were constructed as presented in FIGS. 2A-2B. The electrode was modelled to be 2.5 µm thick, with the space above the electrodes and top of the water being 75 µm, and the CNTs as being attached to the edge of the electrode.

The meshing condition was set up to be a physical-controlled mesh with a defined element size set to "extremely fine" and refined near the electrode surface to yield about 18,000 triangular mesh elements. The model was solved by a built-in linear solver. Boundary conditions were set up to be 0 V for the surfaces of three connected electrodes and 4 V for the other three connected electrode fingers. The material of the electrodes was selected to be glassy carbon. In order to simplify the model, the permittivity was defined to be $1E8 \cdot \varepsilon_0$, while the liquid medium was isopropyl alcohol with conductivity of 6E6 pS/m and relative permittivity of $18.23 \cdot \varepsilon_0$.

Results and Discussion

Continuous vs. Stepwise CNT Bridge Formation

Figure 3A:
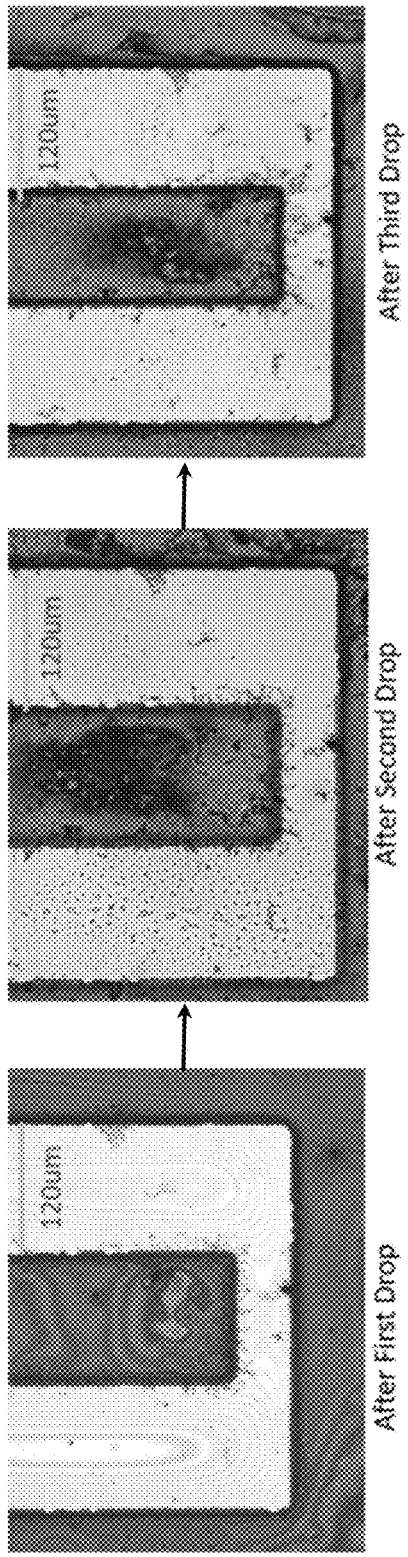
FIGS. 3A-3B show a comparison between CNT conducting bridges formed by the method of the present invention and a one-step procedure.
Figure 3B:
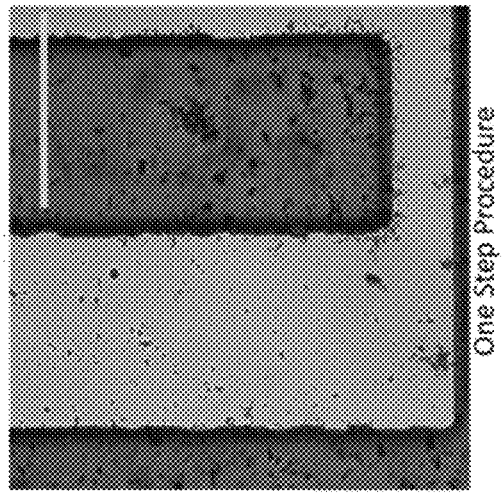

The mechanism leading to the formation of the CNT bridges is explored. First, a one-step procedure of continuous deposition is tested: when one 30 µL drop of CNT suspension is placed onto the IDEA chip with a 5 Vpp bias and applied frequency of 100 kHz, only short segments of CNT chains form after several minutes as seen in FIG. 3B. The likely reason for the inability of this single-step continuous deposition process to form a long CNT bridge is the fact that the resulting CNT line which forms via DEP alignment lacks sufficient nanotube-to-nanotube contact. Thus as the CNT chain is being built, the CNT line becomes more and more resistive until the electric field strength ceases to be sufficient enough for further attraction and alignment of the CNTs.

A stepwise deposition of CNT bridges was successfully performed under a wide range of frequencies. FIG. 3A presents the results of CNT bridge formation after the deposition and drying of three 10 µL drops of CNT suspension (in contrast to a single 30 µL CNT suspension drop used in a single step continuous deposition trial). The applied voltage and frequency of 5 Vpp and 100 kHz, were also used as in the single-step continuous deposition trial. It can be seen in the sequence of optical micrographs in FIGS. 3A-3B how the CNT bridge forms gradually after deposition of each CNT droplet, until a continuous conductive CNT bridge is formed that spans the entire 50 µm inter-electrode spacing.

Applied Frequency Influence on the Morphology of CNT Bridges

Figure 6A:
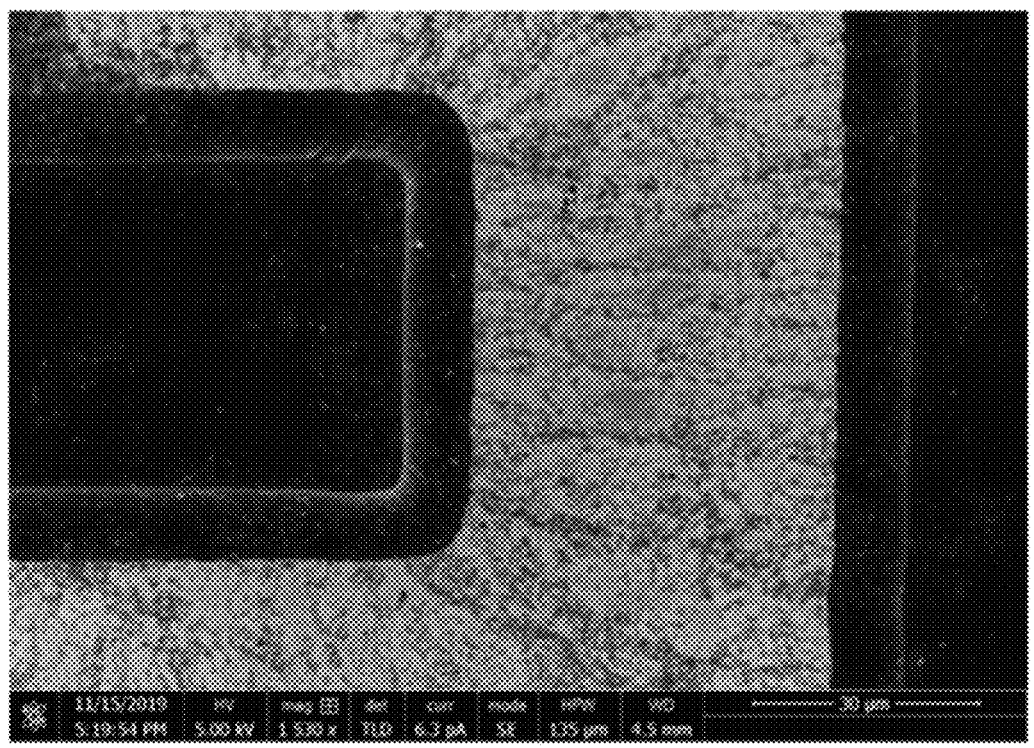
FIGS. 6A-6B show SEM images of CNT bridges deposited under 100 kHz frequencies.
Figure 6B:
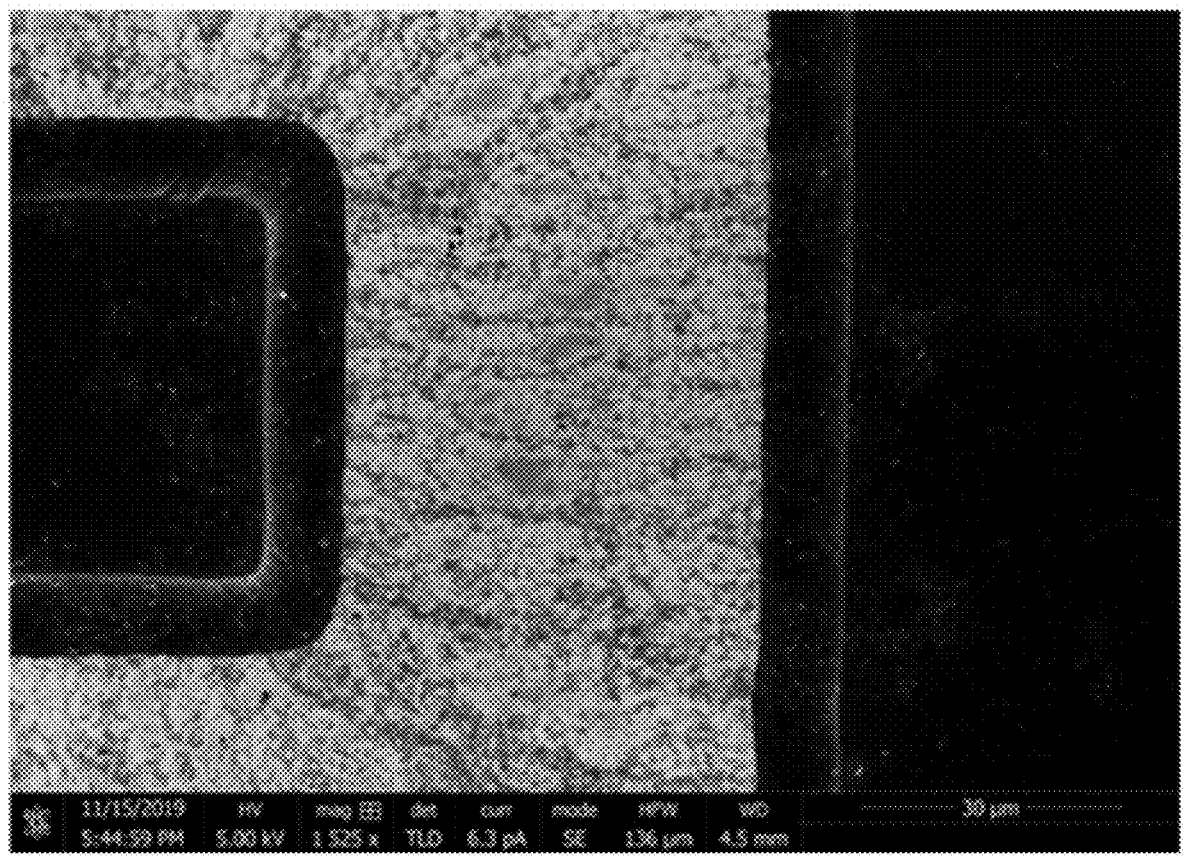

The formation of the bridges was demonstrated under the AC bias of 5 Vpp at frequencies of 1 kHz, 10 kHz, 100 kHz, 1 MHz, and 10 MHz (see optical micrographs on FIGS. 5A-5E and Scanning Electron Microscopy (SEM) images in FIGS. 6A-6B). The morphologies of the CNT bridges depended on the applied frequencies. At relatively low frequencies, such as 10 kHz and 1 kHz, electro-osmotic (EO) forces generate fluidic circulation near the edges of the fingers of the IDEAs where the electric field intensity is strongest. In the presence of these electro-osmotic forces, the alignment of the CNTs is disturbed. Outside the frequency range of EO flow, and within frequencies ranging from 100 kHz to 10 MHz, the positive DEP attraction of CNTs to the edges of the fingers of the electrodes dominate over vanishingly small EO forces. Since the magnitude of the electro-osmotic force increases with decreasing frequency, larger amounts of CNTs need to be deposited at the bridge sites for the bridges to form. This relationship between EO and DEP forces at various frequencies helps to explain the observed morphologies of the CNT bridges.

Influence of Postdeposition Heat Treatment on Resistance of CNT Bridges

Figure 8A:
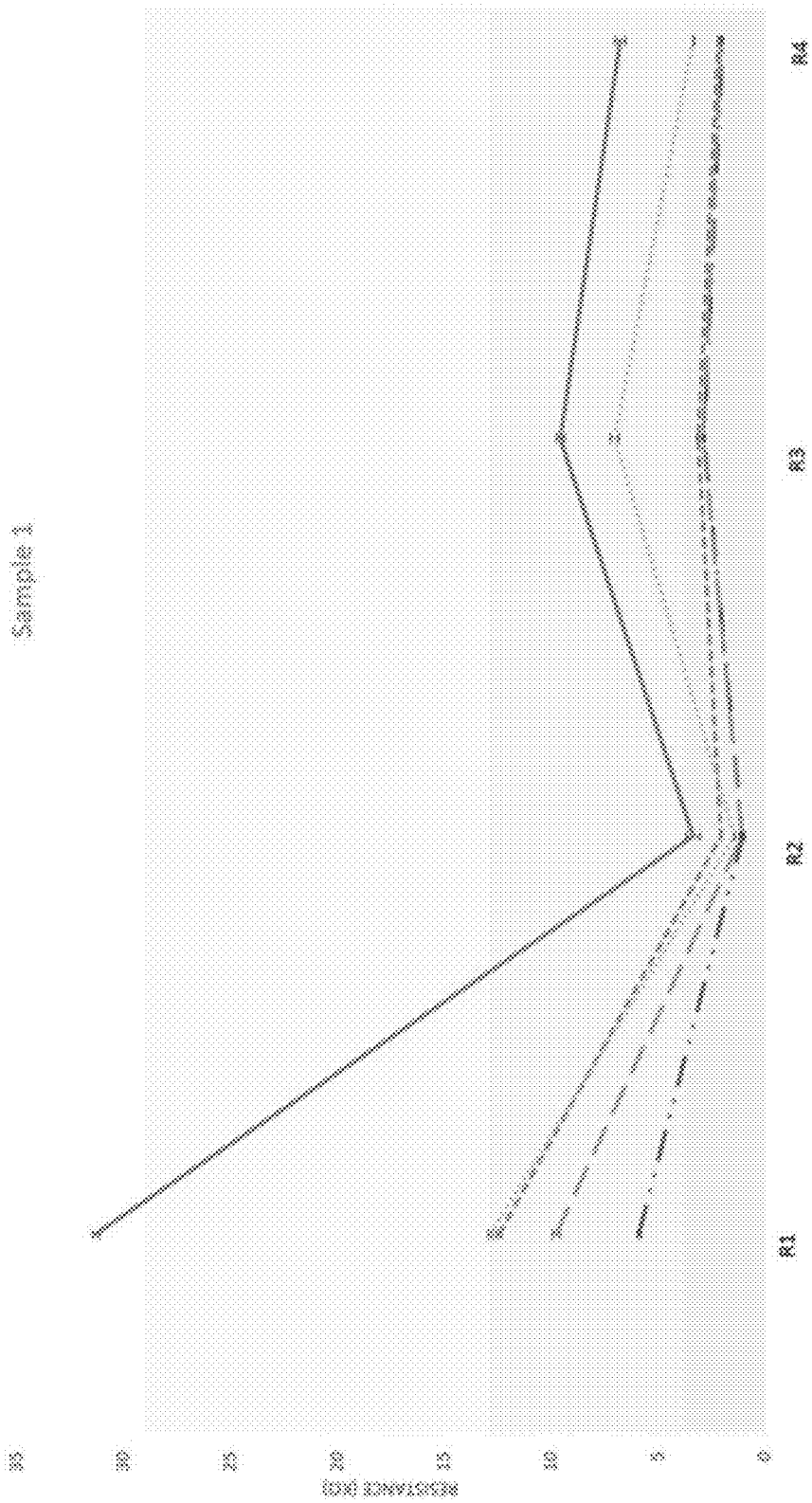
FIGS. 8A-8B show the resistance of CNT bridges as a function of deposition parameter and postdeposition heat treatment including after CNT deposition (R1), dring on a hot plate for 20 min at 200° C. (R2), after polypyrrole deposition (R3), and after final drying on a hot plate for 20 min at 200° C. (R4).
Figure 8B:
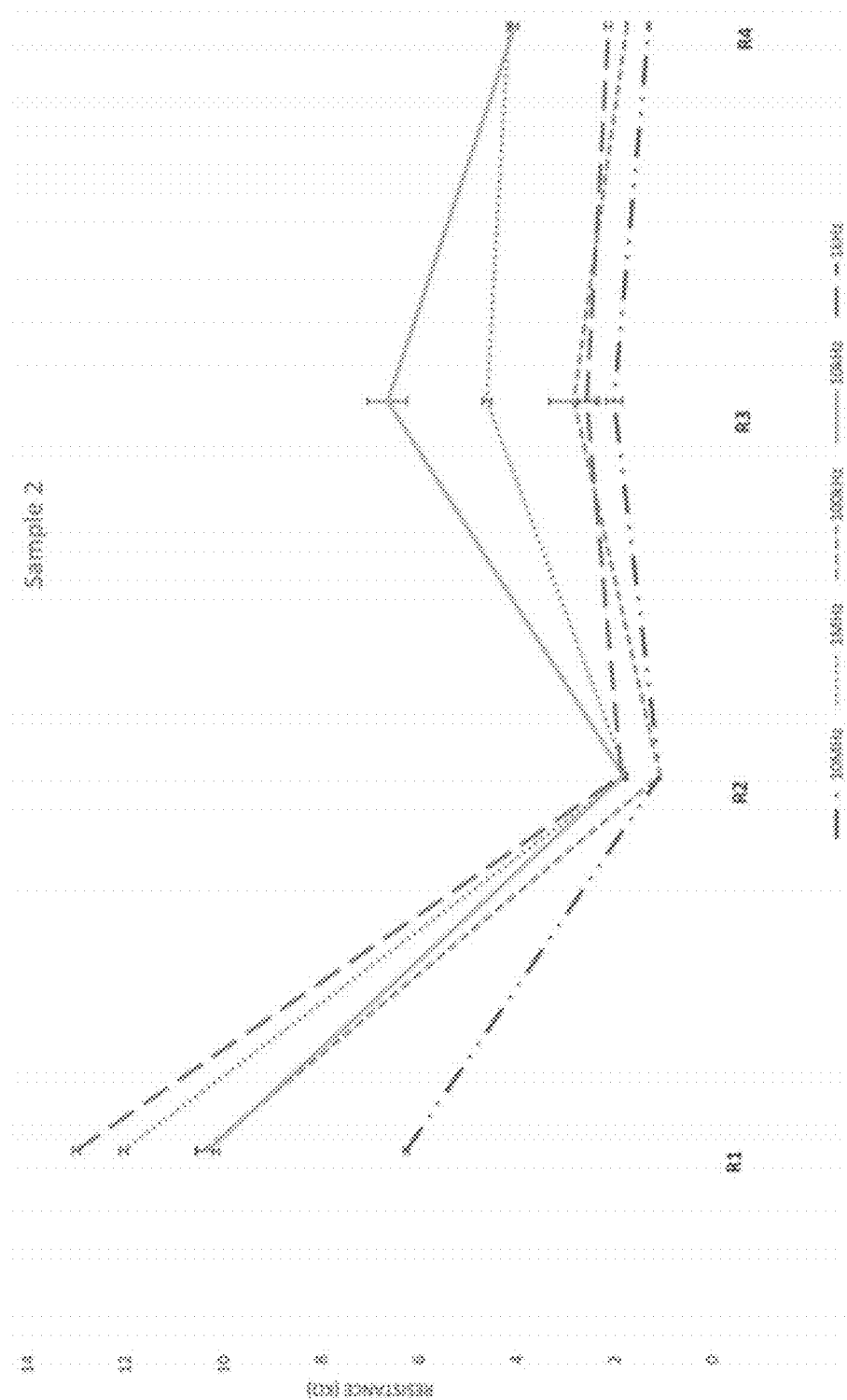

Dependence of post-deposition heat treatment on the resistance of fabricated CNT bridges has been explored on two samples (identified as Sample 1 and Sample 2 in FIG. 7). First, initial resistance of the IDEA array was measured. As expected, prior to CNT bridge deposition, the resistance was infinite. After the CNT bridges formed, the IDEA chip was blow dried with a nitrogen gun for about a minute until the chip was visibly dry, then the resistance of the IDEA was measured by placing the probes of the multimeter on the contact pads of the IDEA chip. That measurement is termed R1. The IDEA chip was then placed on a hot plate at 200° C. for 20 minutes, afterward the resistance was measured again (R2). In order to permanently secure CNT bridges in place, a layer of polypyrrole was electrodeposited as discussed in the Materials and Methods section. After polypyrrole deposition over CNT bridges, the chip was blow dried and the resistance was measured again (R3) and once again (R4) after another heat treatment. The flowchart of these steps is presented in FIG. 1. FIG. 7 contains the resistance measurements for CNT bridges deposited under the variety of applied frequencies, while FIG. 8A-8B represents a graph of these measurements for clear identification of the trends.

Figure 9A:
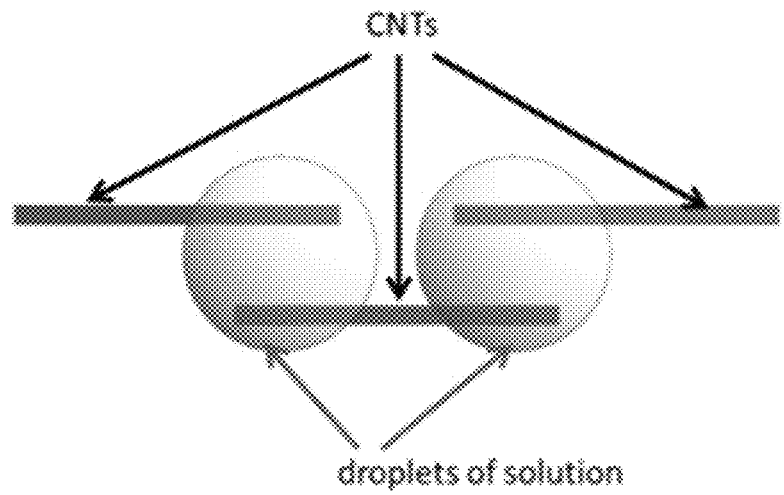
FIGS. 9A-9B show illustrations of the influence of postdeposition heat treatment on CNT bridges.
Figure 9B:
Figure 10A:
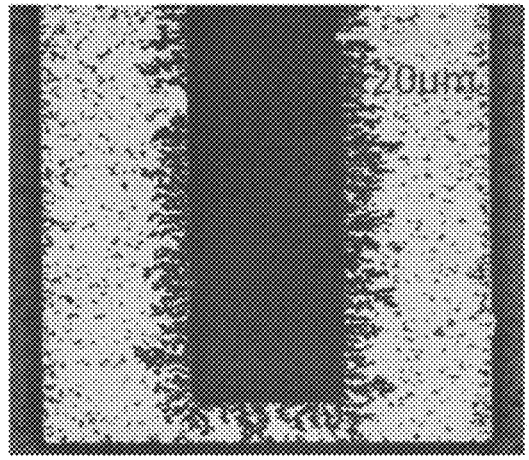
FIGS. 10A-10E show CNT bridges deposited under varying frequencies of 5 Vpp AC bias after electrodeposition of polypyrrole.
Figure 10B:
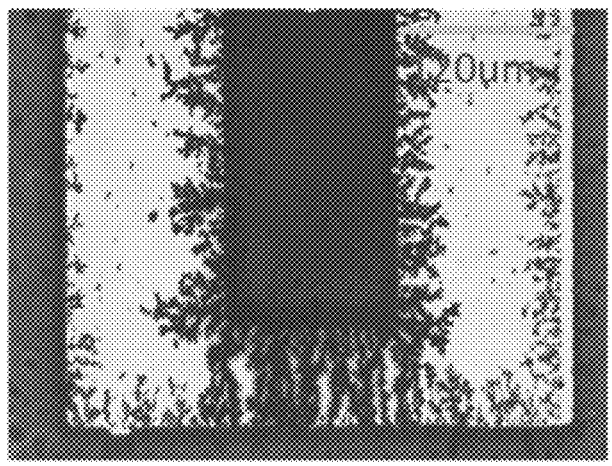
Figure 10C:
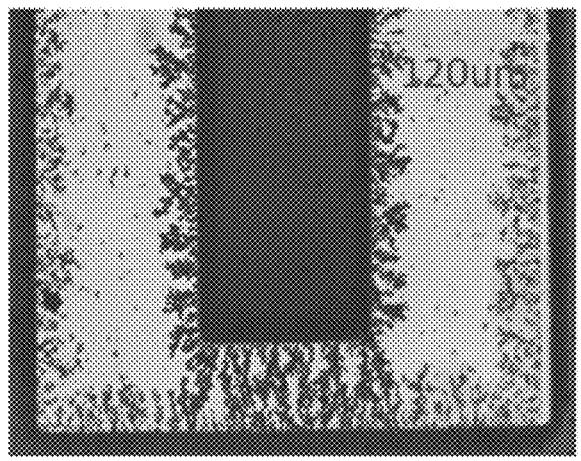
Figure 10D:
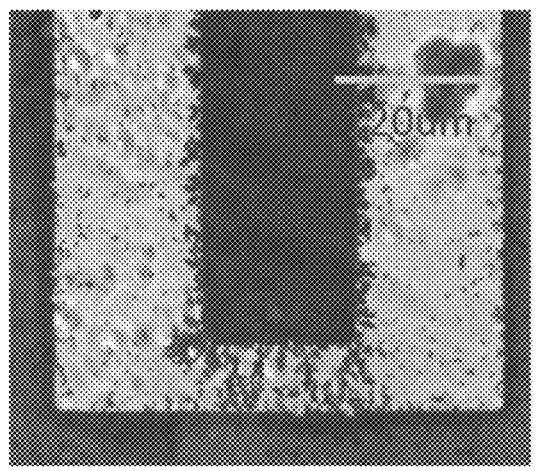
Figure 10E:
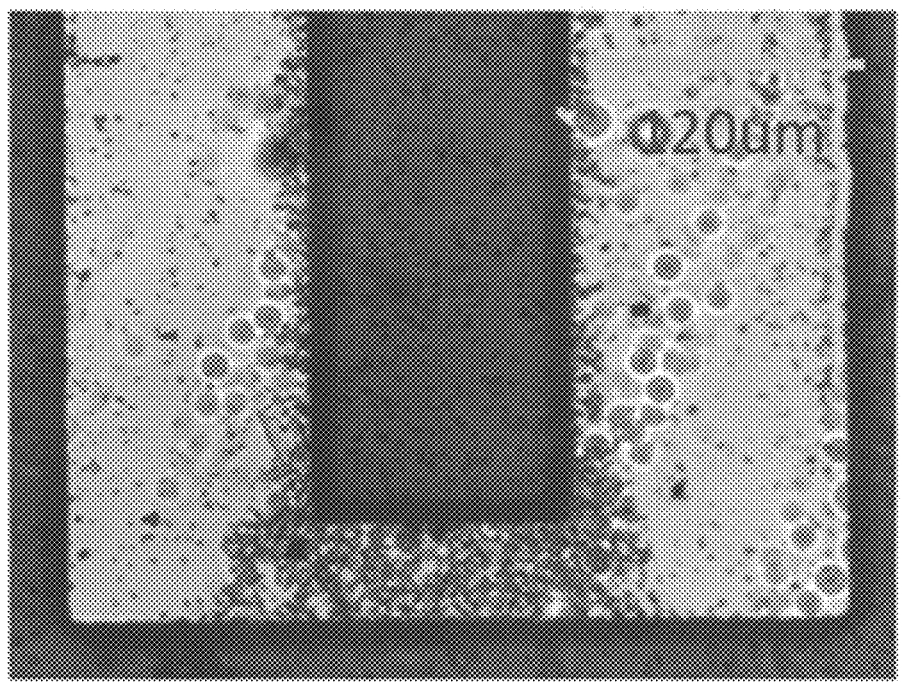

It is clear that as a result of the heat treatment (200° C. for 20 minutes) the resistance of the CNT bridges decreases dramatically. For example, for CNT bridges deposited under 5 Vpp at an AC frequency of 1 MHz, the resistance is reduced six-fold from around 12 kΩ prior to heat treatment to roughly 2 kΩ after the heat treatment. The resistance may be attributed to the evaporation of any residual CNT solution existing between the individual CNTs. These pockets of liquid remaining after blow drying steps start to further shrink and evaporate under the heat treatment. As the liquid surrounding the CNTs evaporates, the surface tension of these shrinking droplets pulls CNTs together as depicted in FIGS. 9A-9B, leading to a dramatic increase in conductivity of CNT bridges.

Polypyrrole Deposition over CNT Bridges

Figure 11A:
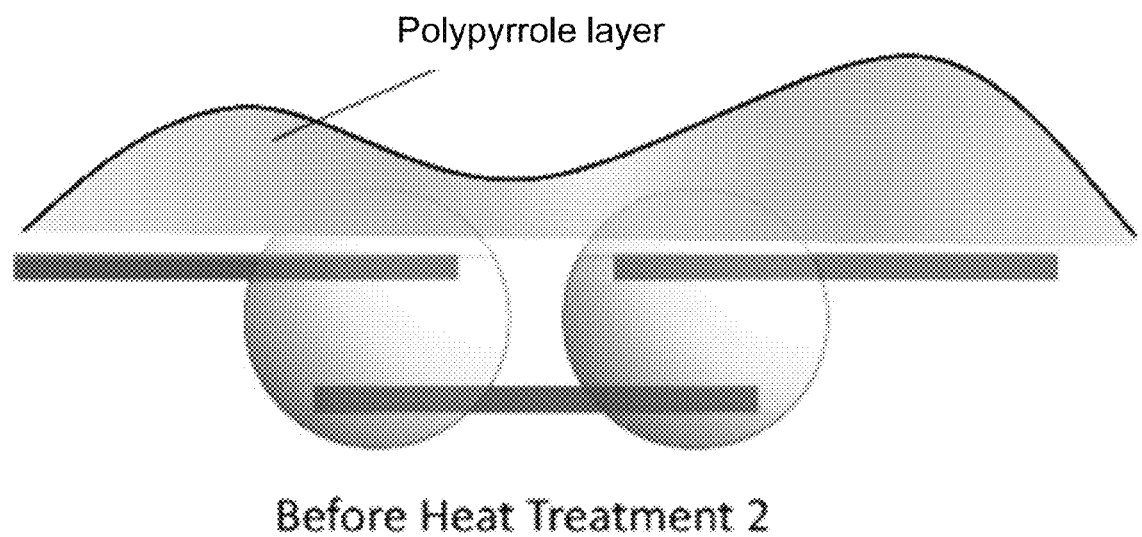
FIGS. 11A-11B show illustrations of the influence of heat treatment on CNT bridges after polypyrrole deposition.
Figure 11B:
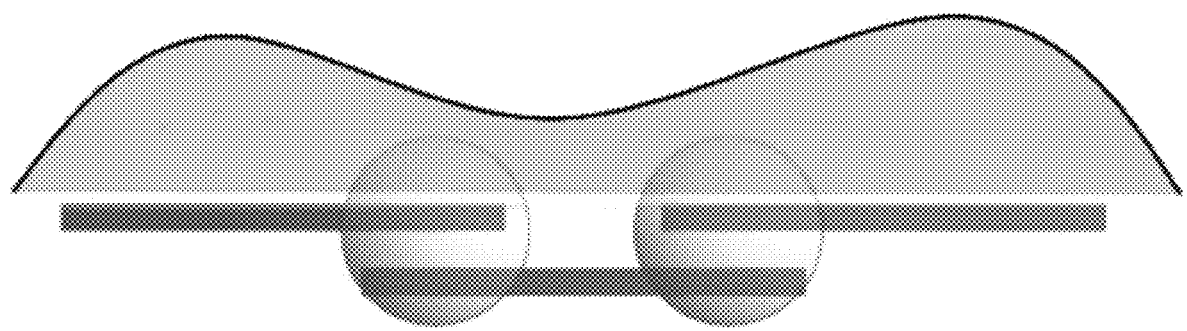

After CNT bridges were deposited under the influence of electrokinetic forces as discussed in previous sections, pyrrole solution was dispensed over the IDEA and electropolymerization was performed to permanently entrap and fix the fabricated CNT bridges. The polypyrrole was initially electropolymerized at the surface of the electrode fingers and subsequently grew along the CNT bridges until a polypyrrole layer completely covered the CNT bridge as shown in FIGS. 10A-10E. The resistances were measured after the polypyrrole deposition (R3) and after the 20 minute heat treatment at 200° C. (R4). These electrical resistance measurements are listed in FIG. 7 and graphed on the plots in FIGS. 8A-8B. The increase in the resistance (R3>R2) after the polypyrrole deposition can be attributed to the introduction of polypyrrole solution that tends to separate CNTs within the bridge. The heat treatment after polypyrrole deposition is not as effective as before (R4>R2) because now there is a polymer film covering CNT bridges that slows down solvent evaporation as illustrated in FIGS. 11A-11B.

The present invention demonstrates a novel step-wise process which incorporates electrokinetic phenomena to deposit and form long chains of CNTs along the electrical field lines of an external AC field. The deposition-drying-deposition sequence of steps allows for creation of conductive CNT bridges between adjacent electrodes. The creation of conductive CNT bridges over 50 microns in length is demonstrated. It has been observed that the morphologies of CNT bridges deposited at frequencies of 100 kHz and above are more orderly than for CNT bridges deposited at lower frequencies. This difference in the morphologies is attributed to the disruptive circulation of fluid caused by electroosmosis at lower frequencies. The role of post-deposition heat treatment was also explored. The observed increase in the conductivity of CNT bridges after the heat treatment step of 200° C. for 20 minutes is consistent with the hypothesis that the evaporating solvent and resulting surface tension pulls together CNTs and consequently decreases CNT-CNT contact resistance. Finally, electrodeposition of polypyrrole was performed to permanently secure CNT bridges. It is believed that the described step-wise electrokinetic deposition process, capable of producing long chains of conductive CNT bridges, will find applications in micro- and nano-electronics, sensors, and energy storage and conversion.

As used herein, the term "about" refers to plus or minus 10% of the referenced number. Although there has been shown and described the preferred embodiment of the present invention, it will be readily apparent to those skilled in the art that modifications may be made thereto which do not exceed the scope of the appended claims. Therefore, the scope of the invention is only to be limited by the following claims. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting essentially of" or "consisting of", and as such the written description requirement for claiming one or more embodiments of the present invention using the phrase "consisting essentially of" or "consisting of" is met.

The reference numbers recited in the below claims are solely for ease of examination of this patent application, and are exemplary, and are not intended in any way to limit the scope of the claims to the particular features having the corresponding reference numbers in the drawings.

What is claimed is:

1. A step-wise method for fabricating conducting bridges between adjacent electrodes, the method comprising:
   a. depositing a droplet (150) containing a suspension of conductive or dielectric nanostructures between a first electrode (100) and second electrode;
   b. applying voltage to the suspension of conductive or dielectric nanostructures using the first electrode (100) immediately after (a);
   c. completely evaporating the droplet (150) containing the suspension of conductive or dielectric nanostructures immediately after (b), wherein complete evaporation of the droplet (150) allows surface tension of the droplet (150) surrounding the deposited conductive or dielectric nanostructures to pull the nanostructures together; and
   d. repeating steps a-c for at least two iterations until a distance between the first electrode (100) and a second electrode (200) is spanned by the conducting bridges; wherein after the first iteration, the deposited nanostructures do not yet form the conductive bridges; wherein the step-wise method is effective at forming conductive bridges that are at least 30 microns in length.

2. The method of claim 1, wherein the method additionally comprises applying heat to the conductive or dielectric nanostructures.

3. The method of claim 1, wherein the method additionally comprises depositing a solution (160) over the conductive or dielectric nanostructures and electropolymerizing the solution (160).

4. The method of claim 3, wherein the droplet (150) containing the conductive or dielectric nanostructures is evaporated after electropolymerizing the solution (160).

5. The method of claim 4, wherein the droplet (150) is evaporated using a nitrogen gun.

6. The method of claim 1, wherein the conductive or dielectric nanostructures are carbon nanotubes (CNT).

7. The method of claim 6, wherein the CNTs are single-wall CNTs, multi-wall CNTs, allotropic CNTs, or a combination thereof.

8. A method for fabricating carbon nanotube (CNT) conducting bridges between adjacent electrodes, the method comprising:
   a. depositing a droplet (150) containing a suspension of CNTs (155) between a first electrode (100) and a second electrode (200);
   b. applying voltage to the suspension of CNTs (155) using the first electrode (100), immediately after (a);
   c. completely evaporating the droplet (150) containing the suspension of CNTs (155) immediately after (b), wherein complete evaporation of the droplet (150) allows surface tension of the droplet (150) surrounding the deposited CNTs (155) to pull the CNTs (155) together; and d. repeating steps a-c for at least two iterations until a distance between the first electrode (100) and a second electrode (200) is spanned by the CNT conducting bridges;

wherein after the first iteration, the deposited nanostructures do not yet form the conductive bridges;

wherein the step-wise method is effective at forming conductive bridges that are at least 30 microns in length.

9. The method of claim 8, wherein the method additionally comprises applying heat to the CNTs.

10. The method of claim 9, wherein 200° C. of heat is applied to the CNTs (155).

11. The method of claim 8, wherein the method additionally comprises depositing a solution (160) over the CNTs (155) and electropolymerizing the solution (160).

12. The method of claim 8, wherein the droplet (150) containing the suspension of CNTs (155) is evaporated after electropolymerizing the solution (160).

13. The method of claim 12, wherein the droplet (150) is evaporated using a nitrogen gun.

14. The method of claim 8, wherein the distance between the first electrode (100) and the second electrode (200) is about 50 microns.

15. The method of claim 8, wherein the droplet (150) comprises isopropyl alcohol.

16. The method of claim 8, wherein the CNTs are single-wall CNTs, multi-wall CNTs, allotropic CNTs, or a combination thereof.

17. The method of claim 8, wherein the voltage applied to the CNTs (155) is a constant 5V peak-to-peak voltage.

18. The method of claim 17, wherein the voltage is applied at a frequency of between 100 kHz and 10 MHz.

19. The method of claim 8, wherein the solution (160) comprises an electropolymerization monomer, NaDBS, and deionized water.

20. The method of claim 19, wherein the electropolymerization monomer is pyrrole.

\* \* \* \* \*